United States Patent [19]

Shiokama et al.

[11] Patent Number: 4,806,000
[45] Date of Patent: Feb. 21, 1989

[54] ZOOM LENS CAPABLE OF MACRO PHOTOGRAPHY

[75] Inventors: Yoshiharu Shiokama, Kawasaki; Naoto Ohta; Hiroshi Okano, both of Tokyo; Kiyotaka Inadome, Kawasaki, all of Japan

[73] Assignee: Nikon Corporation, Tokyo, Japan

[21] Appl. No.: 826,985

[22] Filed: Feb. 7, 1986

[30] Foreign Application Priority Data

Feb. 13, 1985 [JP] Japan ................................. 60-25640
Jun. 6, 1985 [JP] Japan ................................. 60-123212

[51] Int. Cl.$^4$ ............................................. G02B 15/00
[52] U.S. Cl. ..................................... 350/430; 350/429
[58] Field of Search ................. 350/430, 429, 428, 427

[56] References Cited

U.S. PATENT DOCUMENTS

| | | | |
|---|---|---|---|
| 4,054,371 | 10/1977 | Yasukuni | 350/428 |
| 4,324,457 | 4/1982 | Tomori | 350/430 |
| 4,506,959 | 3/1985 | Hama | 350/430 |
| 4,591,235 | 5/1986 | Tokumaru et al. | 350/427 |
| 4,653,873 | 3/1987 | Kawamura | 350/427 |

Primary Examiner—John K. Corbin
Assistant Examiner—Loha Ben
Attorney, Agent, or Firm—Shapiro and Shapiro

[57] ABSTRACT

In a zoom lens a zoom operating ring is rotatable to vary the focal length of an optical system between a first focal length and a second focal length. A distance ring is rotatable to effect focusing of the optical system with respect to an object to be photographed which is positioned in a normal photographing distance range including infinity. A macro operating ring is rotatable to effect focusing of the optical system with respect to an object to be photographed which is positioned in a macro photographing distance range including an area of a shorter distance than a close distance in the normal photographing distance range. The optical system has a maximum magnification when the focal length is equal to the first focal length. In response to rotation of the macro operating ring, the zoom operating ring is rotated when the focal length of the optical system is equal to a given focal length different from the first focal length and the macro operating ring is in a position of rotation corresponding to a shortest distance within the macro photographing distance range conforming to the given focal length.

11 Claims, 7 Drawing Sheets

ZOOM LENS CAPABLE OF MACRO PHOTOGRAPHY

BACKGROUND OF THE INVENTION

1. Field of the Invention

This invention relates to a zoom lens including an area of a shorter distance than the close end of a normal photographing distance range including infinity, that is, a zoom lens which enables distance adjustment in a so-called macro photographing distance range.

2. Description of the Prior Art

In the mechanism in a zoom lens for macro photography, there are a system designed so that a macro photographing distance range and a normal photographing distance range exist continuously within a range obtained by the operation of a ring for adjusting the photographing distance and a system for obtaining a high magnification by moving a plurality of lens groups during macro photography. However, the former is usually an extension of focusing and therefore has a disadvantage that a sufficiently high magnification cannot be obtained, and the latter having a special mechanism is often adopted in zoom lenses capable of macro photography.

It is ideally desirable that macro photography be possible over the whole range of zooming area, but actually, the eclipse of the light beam in a part of the zooming area, the reduction in optical performance and the collision between lenses make macro photography almost impossible in such a zooming area. Accordingly, there have been zoom lenses of a structure in which macro photography is possible only at the long focus side end point or the short focus side end point of the zooming area.

SUMMARY OF THE INVENTION

It is an object of the present invention to provide a zoom lens which enables the macro photography up to a maximum magnification allowed for each focal length to be accomplished in the substantially the entire area of zooming range.

It is another object of the present invention to provide a zoom lens in which the number of lens groups moved during super-proximity in-focus is made great to thereby reduce the amount of movement of the lens groups for obtaining a desired photographing magnification and which is compact as a whole and small in the variation in the performance of the lens.

To achieve the above first object, the zoom lens of the present invention includes a first distance adjusting member for effecting focusing in a normal photographing distance range including infinity, a second distance adjusting member for effecting focusing in a macro photographing distance range including an area of a shorter distance than the close end of the normal photographing distance range, and a focal length adjusting member for effecting zooming in the normal photographing distance range and limiting the operation of the second distance adjusting member, and is designed such that the position for limiting the operation of the second distance adjusting member changes in conformity with the set position of the focal length adjusting member and when the second distance adjusting member is operated beyond the position for limiting the operation thereof, the focal length adjusting member and the second distance adjusting member are operatively associated with each other.

To achieve said another object, the zoom lens of the present invention comprises, in succession from the object side, a first lens group having a negative focal length, a second lens group having a positive focal length, a third lens group having a negative focal length and fixed during a magnification change, and a fourth lens group having a positive focal length, zooming being accomplished by varying the spacings between the lens groups, and is designed such that the first lens group, the second lens group and the fourth lens group are axially moved together toward the object side with the third lens group remaining fixed.

DESCRIPTION OF THE PREFERRED EMBODIMENTS

Figure 1:
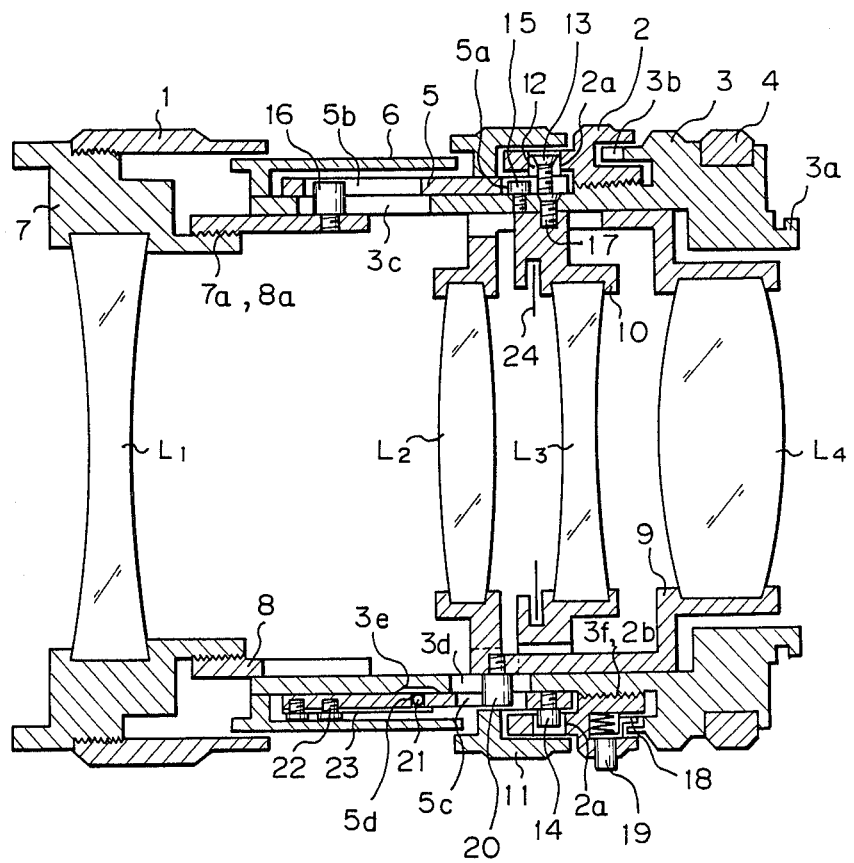
FIG. 1 is a longitudinal cross-sectional view showing an embodiment of the present invention.

Referring to FIG. 1, reference numeral 3 designates a fixed lens barrel, reference numeral 11 denotes a zoom operating ring, reference numeral 2 designates a macro operating ring, and reference numeral 1 denotes a distance ring. The fixed lens barrel 3 has a cylindrical portion extending leftwardly as viewed in FIG. 1 and a coupling portion 3a connected to an unshown camera body at the right end, and supports on the outer periphery thereof a conventional aperture preset ring 4 for adjusting the diameter of the opening of an aperture blade 24 (a mechanism associated with the aperture is omitted herein). The macro focusing operating ring 2 (hereinafter referred to as the "macro operating ring") serving as a second distance adjusting ring is supported on the fixed lens barrel 3 by the threadable engagement between a helicoid thread 2b provided on the inner diameter side of the macro operating ring and a helicoid thread 3f provided on the outer periphery of the fixed lens barrel 3, and is designed to be moved in the direction of the optic axis while being rotated by the rotation thereof in accordance with the lead of the helicoid threads 2b and 3f.

A cam cylinder 5 is rotatably fitted and supported on the outer periphery of the fixed lens barrel 3, and a macro limit pin 14 is studded on the outer periphery of the right end portion of the cam cylinder 5 (as viewed in FIG. 1) and a macro sliding frame 12 is secured to said outer periphery by means of a small screw 13. The macro sliding frame 12 is engaged with a circumferential groove 2a provided in the macro operating ring 2, and the macro limit pin 14 is designed to move in the circumferential groove 2a with the macro sliding frame 12 (see FIG. 3). Also, the zoom operating ring 11 serving as a focal length adjusting member is secured to the outer periphery of the cam cylinder 5. The cam cylinder 5 is formed with a through-aperture 5d opening to the outer peripheral portion of the fixed lens barrel 3, and a steel ball 21 is disposed in the through-aperture 5d. A plate spring 23 is secured to the outer periphery of the cam cylinder 5 by means of a small screw 22 so as to bias the steel ball 21 toward the center of the cam cylinder 5. A straight groove 3e elongated in the direction of the optic axis is provided in the outer peripheral portion of the cylindrical part of the fixed lens barrel 3 corresponding to the portion just beneath the location at which the through-aperture 5d is present in the wide end state of zooming (the state shown in FIGS. 1-3, and the steel ball 21 urged by the biasing force of the plate spring 23 in the wide end state is engaged with the straight groove 3e. The plate spring 23, the steel ball 21 and the straight groove 3e together constitute a click stop mechanism.

Figure 2:
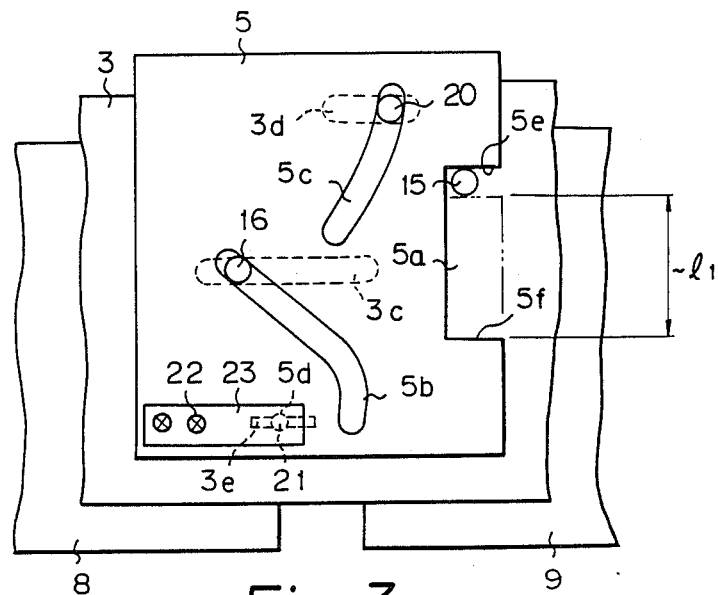
FIG. 2 is a developed view of a lens barrel portion having a cam slot for moving the lens groups of FIG. 1, a sliding pin and a click stop mechanism.

The cam cylinder 5, as shown in FIG. 2, is formed with an arcuate cam slot 5b and an arcuate cam slot 5c, and a first sliding pin 16 studded in a first moving cylinder 8 extends through a first rectilinear guide slot 3c elongatedly formed in the cylindrical portion of the fixed lens barrel 3 in the direction of the optic axis and is slidably engaged with the arcuate cam slot 5b. A second sliding pin 20 studded in a second moving cylinder 9 through a second rectilinear guide slot 3d formed in the cylindrical portion of the fixed lens barrel 3 is slidably engaged with the other arcuate cam slot 5c. Also, a cut-away portion 5a is formed in the right end of the cam cylinder 5, and the upper end 5e or the lower end 5f thereof bears against a limit pin 15 studded in the fixed lens barrel 3, thereby limiting the amount of rotation of the cam cylinder 5, i.e., the amount of zooming.

Figure 3:
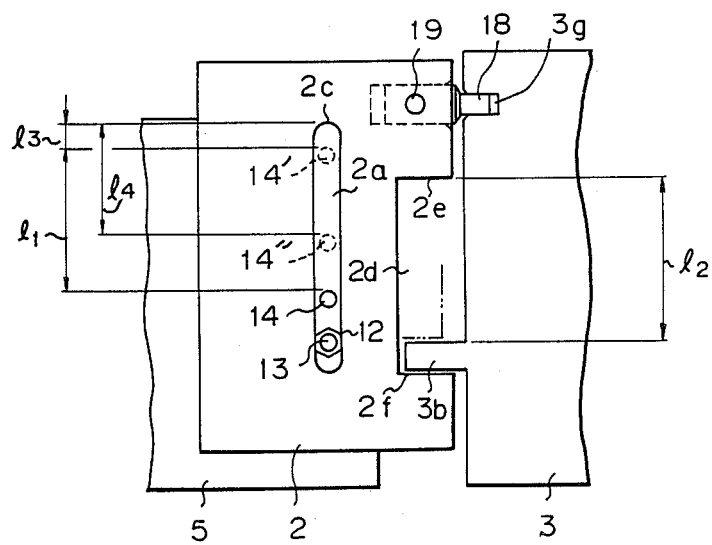
FIG. 3 is a developed view of a macro operating ring portion showing a macro photographing area mechanism and a macro photographing area limitation.

As shown in FIG. 3, a stop 18 is provided on the macro operating ring 2 so as to be operated radially by a change-over button 19, and this stop is engageable and disengageable with a cut-away 3g formed in the fixed lens barrel 3. In the normal photographing state other than the macro photography state, the macro operating ring 2 does not rotate and accordingly is in a completely fixed state because the macro stop 18 is engaged with the cut-away 3g. On the other hand, during macro photography, the macro change-over button 19 is depressed to move the stop 18 in the inward direction of the plane of the drawing sheet of FIG. 3 and bring it out of engagement with the cut-away 3g, whereby the macro operating ring 2 becomes rotatively operable.

The first moving cylinder 8 supporting a first lens holding frame 7 holding a first lens group L1, through helicoid threads 7a and 8a, and the second moving cylinder 9 holding a second lens group L2 and a fourth lens group L4 are slidably supported on the inner periphery of the fixed lens barrel 3, and a fixed lens cylinder 10 holding a third lens group L3 is secured to said inner periphery by means of a small screw 17. The normal photography area distance adjustment operating ring 1 (hereinafter referred to as the "distance ring") serving as a first distance adjusting member having a distance scale for the adjustment of the distances from infinity to the close distance of the normal photography area is secured to the outer periphery of the first lens holding frame 7, and the first lens group L1 is designed to be displaced in the direction of the optic axis while rotating in accordance with the lead of the helicoid threads 7a and 8a by the distance ring being rotated.

An index cylinder 6 is secured to the outer periphery of the left end portion of the fixed lens barrel 3, and as shown in FIGS. 4-7, the distance ring 1 is formed with a distance scale 1a and a triangular index mark 1b indicating the magnification position scale, and the index cylinder 6 is formed with a magnification scale 1c, a base line 6a which provides the index mark of the distance scale 1a, scale lines 6c indicating the amount of infrared correction at a particular focal length, and a focal length scale 6b indicating the focal lengths corresponding to the scale lines 6c.

Operation of the present embodiment will now be described.

The present embodiment is constructed as described above and therefore, when for the purpose of zooming, the zoom operating ring 11 is rotated clock-wise as viewed from the right in FIG. 1 from the wide end fw state of zooming shown in FIGS. 1 and 2 toward the telephoto end ft side, the cam cylinder 5 integral therewith is rotated clockwise about the fixed lens barrel 3 (displaced upwardly as viewed in FIGS. 2 and 3). In this case, the macro sliding frame 12 is engaged with the circumferential groove 2a and the macro operating ring 2 is threadably engaged with the fixed lens barrel 3 by the helicoids 2b and 3f and therefore, unless the macro operating ring 2 is rotated, the cam cylinder 5 will not move in the direction of the optic axis. That is, in the state of normal photography area in which the stop 18 is engaged with the cut-away 3g of the fixed lens barrel 3, the cam cylinder 5 only rotates about the optic axis and does not move in the direction of the optic axis Accordingly, when the cam cylinder 5 rotates clockwise as viewed from the right in FIG. 1, the lower end 5f of the cut-away portion 5a of the cam cylinder 5 bears against the limit pin 15 studded in the fixed lens barrel 3 and the cam cylinder 5 stops rotating at the telephoto end position of zooming. With the rotation of this cam cylinder 5, the first sliding pin 16 slides in the first rectilinear guide slot 3c in accordance with the cam shape of the arcuate cam slot 5b to move the first lens group L1 from the wide end position to the telephoto end position. Also, the second sliding pin 20 is pushed by the arcuate cam slot 5c and is moved leftwardly along the second rectilinear guide slot 3d as viewed in FIG. 2 to move the second lens group L2 and the fourth lens group L4 leftwardly and change the state from the wide end fw state to the telephoto end ft state. The fixed lens cylinder 10 does not move and therefore, the third lens group L3 held thereby remains unmoved.

Distance adjustment (focusing) will now be described. In the case of the adjustment of the distances from infinity to the close distance of the normal photography area, when the distance ring 1 is rotated, the first lens holding frame 7 is moved leftwardly as viewed in FIG. 1 in accordance with the lead of the helicoid threads 7a and 8a while rotating. Accordingly, the first lens group L1 moves leftwardly on the optic axis while rotating and thus, the focusing in the normal photography area becomes possible. The operation of each member is effected completely discretely from the zooming operation and therefore, the focusing in the normal photography area is possible in the entire range of zooming.

When distance adjustment (focusing) is to be effected to an object to be photographed lying in the macro photography area closer than the close distance in the normal photography area, the zoom operating ring 11 is turned to accomplish zooming, whereafter the macro change-over button 19 is depressed to release the engagement between the stop 18 and the cut-away 3g, and then the macro operating ring 2 is rotated. The amount of rotation of the macro operating ring 2 is limited to a distance $l_2$ in FIG. 3 by the interaction of a cut-away 2d at the right end thereof and a projection 3b at the left end of the fixed lens barrel 3. When the macro operating ring 2 is rotated counter-clockwise (displaced downwardly as viewed in FIG. 3) as viewed from the right in FIG. 1 from the wide end state indicated by solid lines in FIGS. 1-3, the macro operating ring 2 moves in the direction of the optic axis while rotating in accordance with the lead of the helicoid threads 2b and 3f. At this time, the cam cylinder 5 is prevented from rotating in the direction of rotation of the macro operating ring 2 by the limit pin 15 and therefore cannot rotate, but is moved in the direction of the optic axis (leftwardly as viewed in FIG. 1) with the macro operating ring 2 by the engagement between the macro sliding frame 12 and the circumferential groove 2a of the macro operating ring 2. In response to this leftward movement of the cam cylinder 5, the first sliding pin 16 and the second sliding pin 20 move leftwardly in the rectilinear slots 3c and 3d with the cam cylinder 5 and therefore, the first moving cylinder 8 and the second moving cylinder 9 move leftwardly along the optic axis. Accordingly, the first lens group L1, the second lens group L2 and the fourth lens group L4 are rectilinearly moved leftwardly as a unit along the optic axis and thus, the macro focusing in the macro photography area becomes possible.

The amount of operation for this macro focusing, i.e., the maximum amount of rotation of the macro operating ring 2, varies in conformity with the focal length set by zooming. For example, in the wide end state shown in FIGS. 1-3, the macro limit pin 14 is in a position indicated by solid line in FIG. 3 and therefore, the macro operating ring 2 can rotate by a distance $(l_1+l_3)=l_2$ until the end surface 2c of the circumferential groove 2a bears against the macro limit pin 14. On the other hand, in the telephoto end state, the macro limit pin 14 is at a position 14' indicated by a broken line in FIG. 3 and the maximum amount of rotation of the macro operating ring 2 is merely a distance $l_3$. Also, in any intermediate position between the wide end and the telephoto end, the macro limit pin is, for example, at a position 14" and the maximum amount of rotation of the macro operating ring 2 is a distance $l_4$. That is, the amount of macro focusing is greatest at the wide end and becomes smaller toward the telephoto end.

In addition, in the present embodiment, if, except at the focal length for which the macro limit pin 14 is at the position as indicated by 14' or 14", that is, except at the wide end, the macro operating ring 2 is further rotated (displaced downwardly as viewed in FIG. 3) from the state in which the end surface 2c of the circumferential groove 2a bears against the limit pin 14 toward the macro close side, the end surface 2c pushes the limit pin 14 and therefore, the cam cylinder 5 and the macro operating ring 2 together rotate until the end surface 5e of the limit cut-away of the cam cylinder 5 bears against the limit pin 15. Accordingly, to whatever focal length the zoom operating ring 11 is set, macro focusing can be accomplished to the macro closest side of the wide end by forcibly rotating the macro operating ring 2. Moreover, once the zoom operating ring 11 is set to the wide end, the cam cylinder 5 is fixed at the wide end position by the aforementioned click stop mechanism. The click stop mechanism sets the rotational torque of the cam cylinder 5 to a proper value except at the wide end and contributes to the improved sense of zooming operation. If the zoom operating ring 11 is thus fixed in the wide end state in which maximum macro photography is possible, macro focusing can conveniently be accomplished by operating only the macro operating ring 2 with the same sense as that when the distance ring 1 is operated. If the click stop mechanism is absent, when the friction force produced between the macro sliding frame 12 and the circumferential groove 2a of the macro operating ring 2 has become increased by some condition, the zoom operating ring 11 will inadvertently deviate from the wide end due to the rotation of the macro operating ring 2 to thereby vary the focal length and therefore, operability will be reduced. However, if this point is not regarded as a problem, the click stop mechanism is not always an indispensable mechanism.

Figure 8:
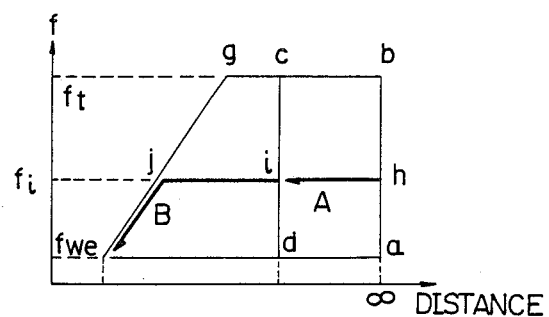
FIG. 8 is a graph showing the relation between the area capable of photographing and the focal length.

FIG. 8 is a graph in which the abscissa represents the photographing distance and the ordinate represents the set focal length of the zoom operating ring 11. In this graph, the inside of a quadrilateral formed by four points a, b, c and d shows the normal photography area, i.e., the range of combination of the focal length and the photographing distance which can be set by the operation of the zoom operating ring 11 and the distance ring 1, and the inside of a quadrilateral formed by four points c, d, e and g shows the macro photography area, i.e., the range of combination of the focal length and the photographing distance which can be set by the operation of the zoom operating ring 11 and the macro operating ring 2. For example, in a state in which the zoom operating ring 11 has been set to a focal length fi, when the distance ring 1 is rotated from ∞ to the close distance, only the photographing distance varies from a point h toward a point i as indicated by arrow A. Subsequently, when the macro operating ring 2 is rotated, macro focusing becomes possible between points i and j, and when the macro operating ring 2 is further rotated forcibly, the focal length and the photographing distance vary from the point j toward the point e. That is, the macro focusing as indicated by arrow B becomes possible by operating only the macro operating ring 2.

Now, considering the conventional wide macro zoom lenses for the sake of contrast, almost all of them have been designed such that macro focusing can be accomplished only in a state in which the zoom operating ring has been fixed at the wide end. In that case, of the macro area (the quadrilateral c-d-e-g) shown in FIG. 8, only the area on the straight line d-e could be photographed. Accordingly, the zoom lens of the present embodiment can be said to have greatly widened the macro photography area from the straight line d-e to the quadrilateral c-d-e-g.

Figure 4:
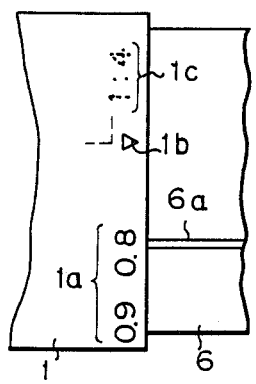
FIGS. 4, 5, 6 and 7 show the scale display of a normal photographing area and a macro photographing area.
Figure 5:
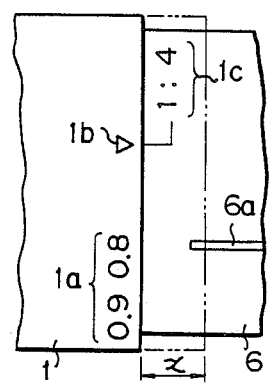
Figure 6:
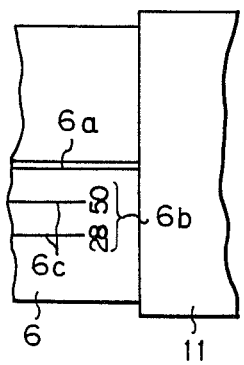
Figure 7:
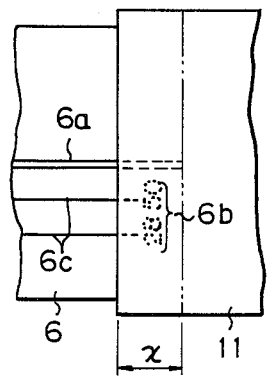

A description will now be provided of the visibility and invisibility of the display outside the lens barrel during focusing and/or during zooming. As previously described, in the macro photography area closer than the normal photography area, the cam cylinder 5 is moved in the direction of the optic axis by the macro operating ring 2 being rotated, and the distance ring 1, together with the first moving cylinder 8, moves in the direction of the optic axis (leftwardly as viewed in FIG. 1) through the engagement between the arcuate cam slot 5b and the first sliding pin 16. Thereupon, the magnification scale 1c hidden by the distance ring 1 as shown in FIG. 4 within the range of the normal photographing distance becomes visible from outside as shown in FIG. 5 by the distance ring 1 moving leftwardly. On the other hand, in the normal photography state, the focal length scale 6b and the infrared correction scale 6c are visible as shown in FIG. 6, and when the zoom operating ring 11 is moved leftwardly by a length x in the macro photographing area, those scales become invisibly hidden under the zoom operating ring 11 as shown in FIG. 7.

That is, the macro magnification scale 1c is entirely invisible in the normal photography state and is displayed only in the macro photography state and therefore, wrong reading does not occur and the confirmation of the macro photography state can be easily accomplished. Also, the infrared correction display 6c which cannot be used during macro photography under the influence of aberrations or the like is hidden only during macro photography and can thereby be prevented from being used by mistake.

Figure 9:
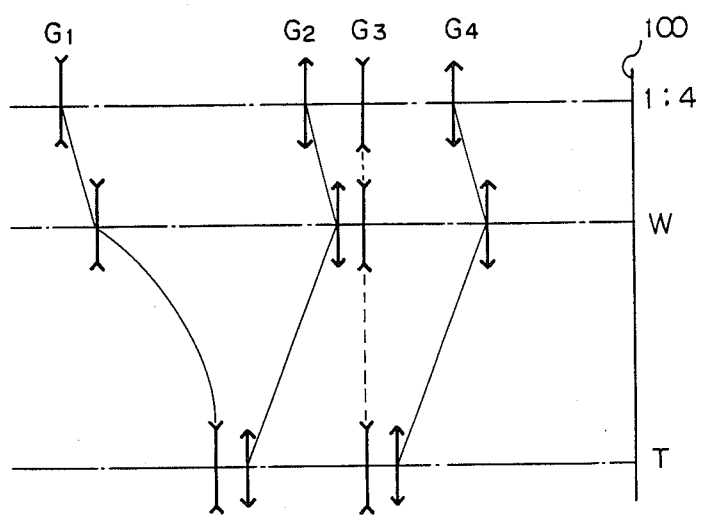
FIG. 9 shows the movement locus of a four-group zoom lens corresponding to the embodiment of FIG. 1.

In FIG. 9, there is shown the movement locus of a four-group zoom lens corresponding to the above-described embodiment. This zoom lens comprises a first lens group G1 of negative refractive power, a second lens group G2 of positive refractive power, a third lens group G3 of negative refractive power and a fourth lens group G4 of positive refractive power. During the magnification change from the wide angle end W to the telephoto end T, the second lens group G2 and the fourth lens group G4 are moved together toward the object side, the third lens group G3 is fixed relative to the image plane 100, and the first lens group G1 is first moved toward the image plane side to make the imaging position constant, and then moved toward the object side. In macro photography, the first lens group G1, the second lens group G2 and the fourth lens group G4 are moved together toward the object side. The maximum macro photographing magnification is realized by the movement from the wide angle side. The lens groups G1, G2, G3 and G4 correspond to the lenses L1, L2, L3 and L4, respectively, in the previous embodiment.

Figure 10:
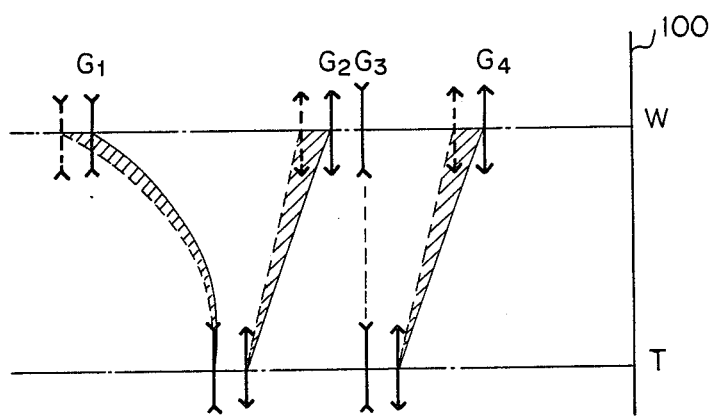
FIG. 10 illustrates the operation of the four-group zoom lens.

FIG. 10 shows the state of the movement for macro photography in the entire magnification change range. In FIG. 10, the portion indicated by dash lines represent the maximum movement position during macro photography at any focal length, and the portions indicated by hatching represent the movable areas in macro photography.

Figure 11:
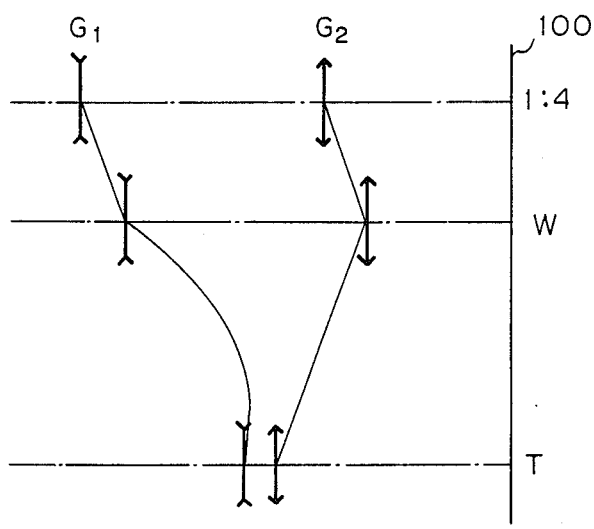
FIGS. 11 and 13 show modifications of the zoom lens of FIG. 9.

FIG. 11 shows the movement locus of a two-group zoom lens as another embodiment. This zoom lens comprises a first lens group G1 of negative refractive power and a second lens group G2 of positive refractive power. During the magnification change from the wide angle end W to the telephoto end T, the second lens group G2 is moved toward the object side and the first lens group G1 is first moved toward the image side to make the imaging position constant, and then moved toward the object side. In macro photography, the first lens group G1 and the second lens group G2 are moved together toward the object side. The maximum macro photographing magnification is realized by the movement from the wide angle side.

Figure 12:
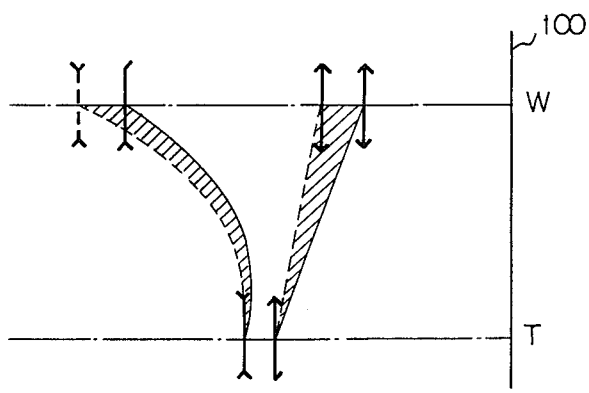
FIGS. 12 and 14 illustrate the operations of the modifications.

FIG. 12 shows the state of the movement for macro photography in the entire magnification change range. In FIG. 12, the portion indicated by dash lines represent the maximum movement position during macro photography at any focal length and the portions indicated by hatching represent the movable areas in macro photography.

Figure 13:
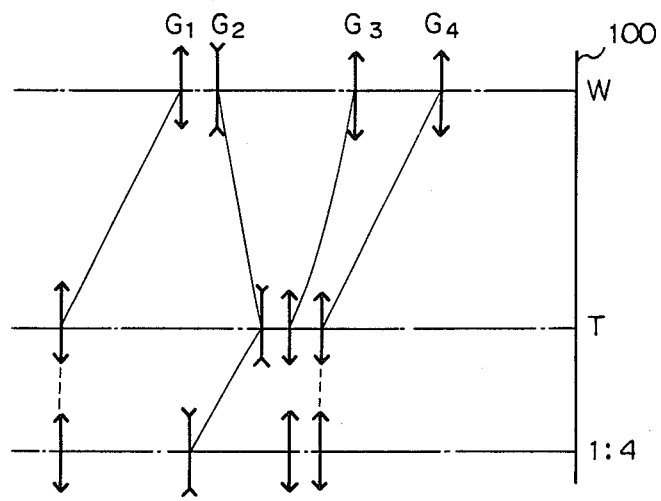

FIG. 13 shows the movement locus of a four-group zoom lens as still another embodiment. This zoom lens comprises a first lens group G1 of positive refractive power, a second lens group G2 of negative refractive power, a third lens group G3 of positive refractive power and a fourth lens group G4 of positive refractive power. During the magnification change from the wide angle end W to the telephoto end T, the first lens group G1 and the fourth lens group G4 are moved together toward the object side, the second lens group G2 is moved toward the image side and the third lens group G3 is moved toward the object side to make the imaging position constant. In macro photography, the second lens group G2 is moved toward the object side. The maximum macro photographing magnification is realized by the telephoto end.

Figure 14:
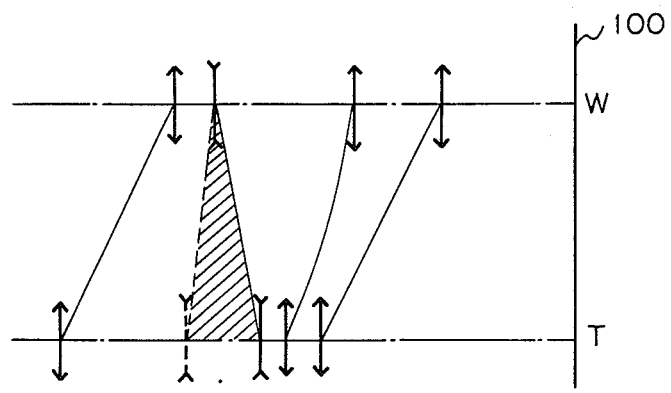

FIG. 14 shows the state of the movement for macro photography in the entire magnification change range. In FIG. 14, the portion indicated by dash lines represents the maximum movement position during the macro photography at any focal length and the portion indicated by hatching represents the movable area in macro photography.

In the first embodiment, as soon as the end surface 2c of the circumferential groove of the macro operating ring 2 bears against the limit pin 14 in the maximum macro state of the wide end, the end surface 2e of the cut-away 2d bears against the projection 3b of the fixed lens barrel to prevent the rotational force of the macro operating ring 2 from concentrating on the limit pins 15 and 14 (the distance is set to $l_3 + l_1 = l_2$). However, this is not always an indispensable condition. The distance may be set to a relation that $l_3 + l_1 < l_2$, or in conformity with the convenience of the optical system, the amount of macro operation $l_3$ at the telephoto end may be set to $l_3 = 0$.

Also, in the optical system of the first embodiment, during zooming, the first lens group L1 and the second and fourth lens groups L2 and L4 are moved at different speeds, and during macro focusing, the first, second and fourth lens groups L1, L2 and L4 are moved together, but there exist various other macro zoom lens optical systems and of course, the application of the present invention is not limited to the optical system shown in the previously described embodiment.

Further, in the previously described embodiment, only one cam cylinder 5 is provided and therefore, the movement of the optical system during macro focusing can only be set to a single speed. However, if for example the cam cylinder is divided into two or more portions and the design is such that the movements of the respective cam cylinders during macro focusing are effected by discrete macro moving helicoid threads, the respective lens groups can be moved at different speeds to accomplish macro focusing.

Figure 15:
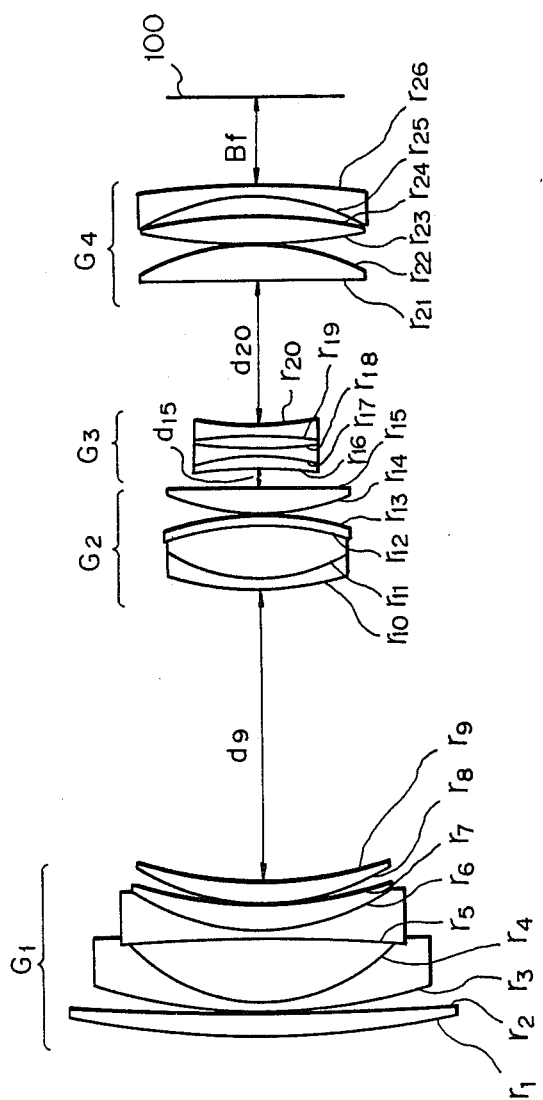
FIG. 15 specifically shows the construction of the lens according to the first embodiment of the present invention.

The lens groups G1, G2, G3 and G4 in FIG. 15 correspond to the lenses L1, L2, L3 and L4, respectively, of FIG. 1.

The numerical data of the lens systems constituting the respective lens groups G1–G4 and of the zoom lens at telephoto, wide angle and superproximity (magnification change rate $\beta = -0.25$) are as shown in Tables 1 and 2 below.

TABLE 1

Focal length f = 28.8–83.3 mm
F-number 3.5–4.0

| No. | Radius of curvature r (mm) | Center thickness or spacing d (mm) | Refractive index n | Abbe number ν | |
|---|---|---|---|---|---|
| 1 | 149.991 | 3.000 | 1.48749 | 70.2 | G1 |
| 2 | 431.194 | 0.100 | | | |
| 3 | 75.043 | 1.700 | 1.71700 | 48.1 | |
| 4 | 25.703 | 7.900 | | | |
| 5 | −1130.610 | 1.200 | 1.79668 | 45.5 | |
| 6 | 29.317 | 3.900 | 1.80458 | 25.5 | |
| 7 | 56.658 | 0.250 | | | |
| 8 | 34.009 | 2.400 | 1.86074 | 23.0 | |
| 9 | 47.268 | d9 = variable | | | |
| 10 | 36.551 | 1.200 | 1.86074 | 23.0 | G2 |
| 11 | 22.699 | 7.400 | 1.48749 | 70.2 | |
| 12 | −29.749 | 1.200 | 1.58144 | 40.8 | |
| 13 | −52.051 | 0.100 | | | |
| 14 | 32.773 | 3.600 | 1.60311 | 60.7 | |
| 15 | −1305.526 | d15 = variable | | | |
| 16 | −100.418 | 1.900 | 1.78470 | 26.1 | G3 |
| 17 | −32.631 | 1.000 | 1.51680 | 64.1 | |
| 18 | 410.041 | 1.300 | | | |
| 19 | −51.601 | 1.200 | 1.51835 | 60.3 | |
| 20 | 36.052 | d20 = variable | | | |
| 21 | 849.830 | 5.400 | 1.58913 | 61.2 | G4 |
| 22 | −29.228 | 0.100 | | | |
| 23 | 94.230 | 3.700 | 1.62280 | 57.0 | |
| 24 | −70.653 | 2.700 | | | |
| 25 | −29.860 | 1.200 | 1.79504 | 28.6 | |
| 26 | −156.189 | Bf = variable | | | |

TABLE 2

| f | 83.3 | 28.8 | $\beta = -0.25$ |
|---|---|---|---|
| d9 | 0.835 | 41.311 | 41.311 |
| d15 | 20.744 | 2.945 | 5.258 |
| d20 | 2.120 | 19.920 | 17.606 |
| Bf | 57.087 | 39.287 | 41.601 |

(f, d, and βf stated in mm);

Referring to Table 2, when shifting from the wide angle end of focal length f=28.8 mm to super-proximity photography ($\beta = -0.25$), the spacing d9 between the first lens group G1 and the second lens group G2 remains to be 41.311 mm, the spacing d15 between the second lens group G2 and the third lens group G3 is changed from 2.945 mm to 5.258 mm and the spacing d20 between the third lens group G3 and the fourth lens group G4 is changed from 19.920 mm to 17.606 mm.

Also, the shift from the wide angle end to the telephoto is accomplished by axially moving the second and fourth lens groups G2 and G4 together and inwardly moving the first lens group G1 singly. That is, referring to Table 2, when shifting from the wide angle end of focal length f=28.8 mm to the telephoto end of focal length f=83.3 mm, the spacing d9 between the first lens group G1 and the second lens group G2 is changed from 41.311 mm to 0.835 mm, the spacing d15 between the second lens group G2 and the third lens group G3 is changed from 2.945 mm to 20.744 mm and the spacing d20 between the third lens group G3 and the fourth lens group G4 is changed from 19.92 mm to 2.120 mm.

In the present embodiment, during the shift from the wide angle end to the super-proximity in-focus, the first, second and fourth lens groups G1, G2 and G4 are axially moved together, and during the shift from the wide angle end to the telephoto end, the second and fourth lens groups G2 and G4 are axially moved together and the first lens group G1 is inwardly moved singly, and focusing is effected by moving the first lens group G1.

In the present embodiment, when shifting from the wide angle end to the super-proximity in-focus of magnification change rate $\beta = -0.25$, the lens groups G1, G2 and G4 may simply be axially moved by the order of 2.31 mm.

We claim:

1. A zoom lens including:
   an optical system;
   zoom operating ring means rotatable to vary the focal length of said optical system between a first focal length and a second focal length
   distance ring means rotatable to effect focusing of said optical system with respect to an object to be photographed which is positioned in a normal photographing distance range including infinity;
   macro operating ring means rotatable to effect focusing of said optical system with respect to an object to be photographed which is positioned in a macro photographing distance range including an area of a shorter distance than a close distance in said normal photographing distance range, said optical system having a maximum magnification when the focal length is of said optical system equal to said first focal length; and
   rotating means responsive to rotation of said macro operating ring means for rotating said zoom operating ring means when the focal length of said optical system is equal to a given focal length different from said first focal length and said macro operating ring means is in a position of rotation corresponding to a shortest distance within said macro photographing distance range conforming to said given focal length.

2. A zoom lens according to claim 1, wherein said rotating means causes said zoom operating ring means to mechanically couple with said macro operating ring means.

3. A zoom lens according to claim 2, wherein each of said zoom operating ring means, said distance ring means and said macro operating ring means has a shape of a barrel.

4. A zoom lens according to claim 3, wherein said rotating means has a protuberant member protruding from one of said zoom operating ring means and said macro operating ring means, and limiting means formed on the other of said zoom operating ring means and said macro operating ring means, and wherein said limiting means limits a range of movement of said protuberant member so that the rotation of said one of said zoom operating ring means and said macro operating ring means is limited with respect to said other of said zoom operating ring means and said macro operating ring means.

5. A zoom lens according to claim 4, wherein said limiting means limits the range of the movement of said protuberant member in a direction of rotation of said macro operating ring means.

6. A zoom lens according to claim 5, wherein said first focal length is shorter than said second focal length, and wherein the rotation of said macro operating ring means causes said rotating means to rotate said zoom operating ring means so that the focal length of said optical system varies to have said first focal length.

7. A zoom lens according to claim 6 which further comprises, in succession from the object side, a first lens group of negative refractive power, a second lens group of positive refractive power, a third lens group of negative refractive power, and a fourth lens group of negative refractive power, and wherein said first, second and fourth lens groups move along an optical axis of said optical system in response to the rotation of each of said distance ring means and said macro operating ring means.

8. A zoom lens according to claim 7, which further comprises scale means for displaying information with respect to magnification of macro photography and a shielding member for hiding said scale means when said optical system is focused with respect to an object to be photographed which is positioned in said normal photographic distance range, wherein said optical system is capable of focusing with respect to an object to be photographed which is positioned in said macro photographing distance range when said macro operating ring means is rotated in a predetermined direction, and wherein said shielding member is moved, in association with the rotation of said macro operating ring means in said predetermined direction, to a position where said shielding member does not hide said scale means.

9. A zoom lens according to claim 8, which further comprises another scale means for displaying other information that is unnecessary for macro photography, and another shielding member for hiding said other scale means when said optical system is focused with respect to an object to be photographed which is positioned in macro photographing distance range, wherein said other shielding member is moved, in association with the rotation of said macro operating ring means in a direction opposite to said predetermined direction, to a position where said other shielding member does not hide said other scale means.

10. A zoom lens including:
a optical system;
a first distance adjusting member operable to effect focusing of said optical system with respect to an object to be photographed which is positioned in a normal photographing distance range including infinity
a second distance adjusting member operable to effect focusing of said optical system with respect to an object to be photographed which is positioned in a macro photo graphing distance range including an area of a shorter distance than a close distance in said normal photographing distance range; and
a focal length adjusting member operable to vary the focal length of said optical system so that the focal length of said optical system varies in response to an operated position of said focal length adjusting member;
said focal length adjusting member limiting the operation of said second distance adjusting member so that a position for limiting the operation of said second distance adjusting member varies in conformity with said operated position of said focal length adjusting member, said second distance adjusting member and said focal length adjusting member being operatively associated with each other when said second distance adjusting member is operated beyond the position for limiting the operation of said second distance adjusting member.

11. A zoom lens including:
an optical system;
zoom operating ring means operable to vary a focal length of said optical system between a first focal length and a second focal length;
distance ring means operable to effect focusing of said optical system with respect to an object to be photographed which is positioned in a normal photographing distance range including infinity;
macro operating ring means operable to effect focusing of said optical system with respect to an object to be photographed which is positioned in a macro photographing distance range including an area of a shorter distance than a close distance in said normal photographing distance range, said optical system having a maximum magnification when the focal length is equal to said first focal length; and
rotating means responsive to the operation of said macro operating ring means for rotating said zoom operating ring means.

* * * * *